(12) United States Patent
Ziems et al.

(10) Patent No.: US 12,152,911 B2
(45) Date of Patent: Nov. 26, 2024

(54) MODULAR MULTI-SENSOR FIRE DETECTOR, ADAPTER AND METHOD FOR SIMPLIFIED INSTALLATION ON A WALL

(71) Applicant: Minimax Viking Patent Management GmbH, Bad Oldesloe (DE)

(72) Inventors: Bernd Ziems, Zarpen (DE); Timo Ziegenbein, Mollhagen (DE); Dirk Siemer, Rethwisch (DE); Benjamin Marquardt, Lübeck (DE); Hauke Dittmer, Fehmarn (DE)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 0 days.

(21) Appl. No.: 18/569,002

(22) PCT Filed: Jun. 30, 2022

(86) PCT No.: PCT/EP2022/068182
§ 371 (c)(1),
(2) Date: Dec. 11, 2023

(87) PCT Pub. No.: WO2023/275315
PCT Pub. Date: Jan. 5, 2023

(65) Prior Publication Data
US 2024/0263976 A1    Aug. 8, 2024

(30) Foreign Application Priority Data
Jun. 30, 2021  (EP) .................................. 21183000

(51) Int. Cl.
| G08B 17/00 | (2006.01) |
| G01D 11/30 | (2006.01) |
| G01D 21/02 | (2006.01) |

(52) U.S. Cl.
CPC ........... *G01D 11/305* (2013.01); *G01D 21/02* (2013.01); *G08B 17/00* (2013.01)

(58) Field of Classification Search
None
See application file for complete search history.

(56) References Cited

U.S. PATENT DOCUMENTS 5,461,367 A    10/1995  Altavela et al.
8,253,106 B2 *  8/2012  Dittmer ..................... G01J 5/08
                                                  250/339.15

(Continued)

FOREIGN PATENT DOCUMENTS

WO    WO2017140518    8/2017

OTHER PUBLICATIONS

International Searching Authority, International Search Report with English translation, International Application No. PCT/EP2022/068182, 6 pages; Nov. 8, 2022.

(Continued)

*Primary Examiner* — Daniel S Larkin
(74) *Attorney, Agent, or Firm* — Perkins Coie LLP

(57) ABSTRACT

A modular multi-sensor fire detector including an evaluation unit having a housing, a plurality of sensor heads, and at least one adapter. At least one of the plurality of sensor heads has at least one hazard parameter conductor with a mounting tube having a proximal end, a distal end and a fastener at the proximal end. The at least one adapter is attached to the mounting tube and includes a first fastening point, a second fastening point and a third fastening point. The first fastening point for connection to the fastener on the mounting tube, the second fastening point for connection to a capping device, and the third fastening point for connection to a wall.

19 Claims, 4 Drawing Sheets

(56) References Cited

U.S. PATENT DOCUMENTS 10,825,312 B2 11/2020 Ziems et al.
2019/0139397 A1* 5/2019 Ziems .................. G08C 23/04

OTHER PUBLICATIONS

International Searching Authority, Written Opinion with English translation, International Application No. PCT/EP2022/068182, 10 pages; Nov. 8, 2022.

Minimax, "UniVario YMX5000 Modulares System zur Flammen— und Funkendetektion mit selbstüberwachter Sensorik", Dec. 17, 2017 (Dec. 17, 2017), https://www.minimax.com/de/de/technologies/fire-detection-systems-and-suppression-control/univario-industrial-fire-detectors/Abgerufen von: URL:chromeextension://efaidnbmnn-nibpcajpcglclefindmkaj/https://www.minimax.com/downloads/detail/209/de/, with English translation, 6 pages.

* cited by examiner

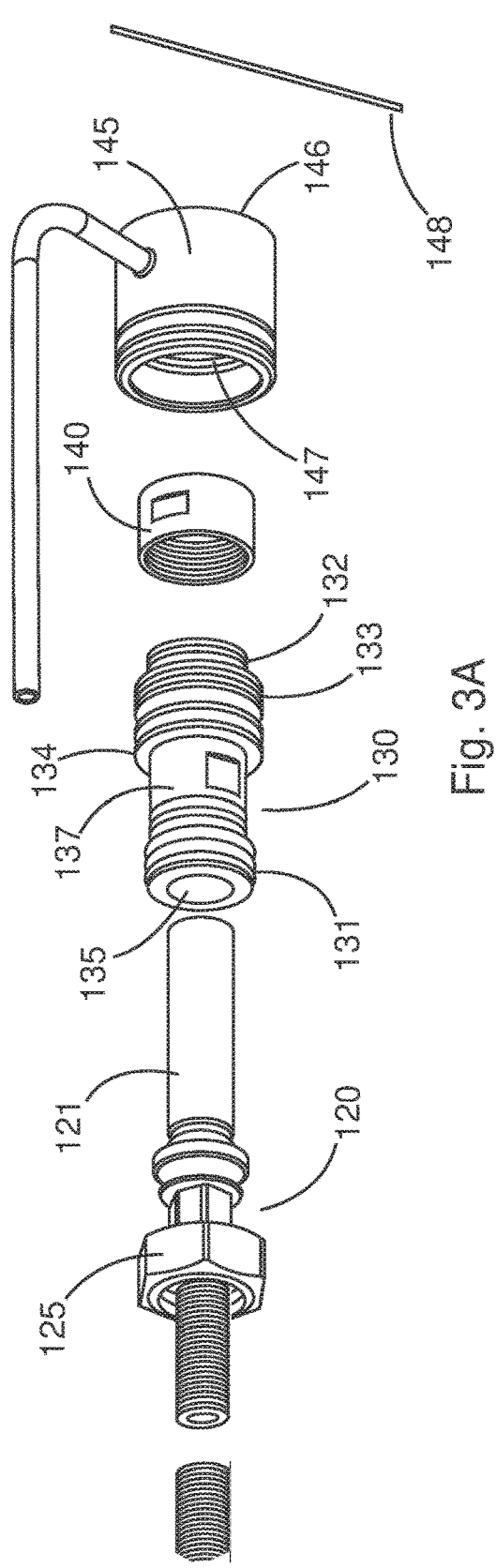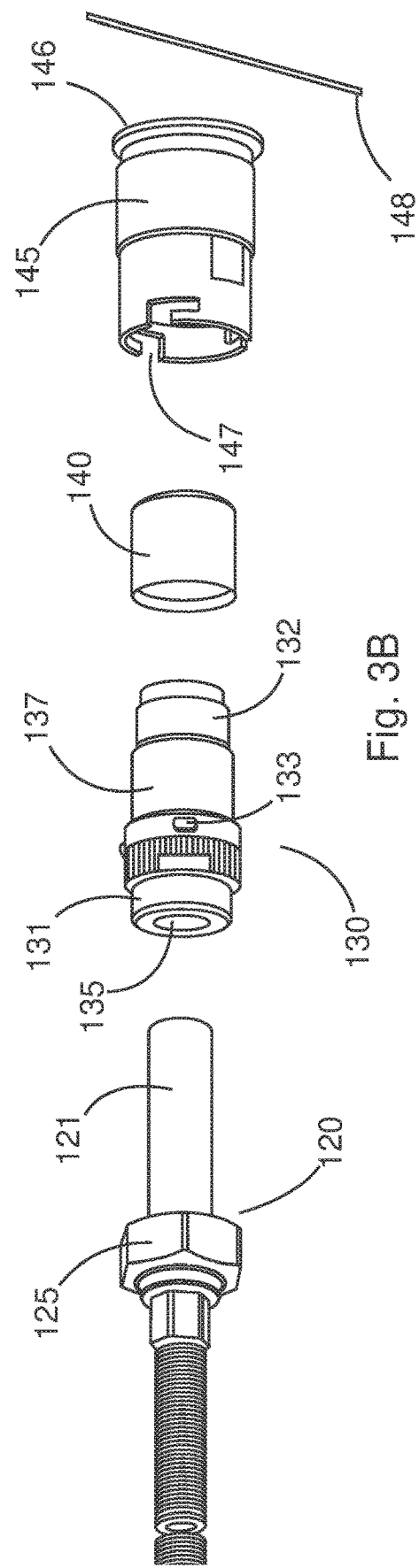

MODULAR MULTI-SENSOR FIRE DETECTOR, ADAPTER AND METHOD FOR SIMPLIFIED INSTALLATION ON A WALL

PRIORITY CLAIM AND INCORPORATION BY REFERENCE

This application is a 35 U.S.C. § 371 application of International Application No. PCT/EP2022/068182, filed Jun. 30, 2022, which claims the benefit of European Application No. 21183000.5, filed Jun. 30, 2021, each of which is incorporated by reference in its entirety.

BACKGROUND AND SUMMARY OF THE INVENTION

The invention relates to a modular multi-sensor fire detector, to an adapter for a fire detector and to a method for connecting a fire detector to a wall.

Fire detectors are used in a generally known manner to monitor objects such as machines, production processes, gas turbines, bearings, etc. for the occurrence of fire hazards. This is done by the use of sensors to recognize hazard parameters. Known from the prior art are fire detection systems in which one or more fire detectors are installed in a room or in an area to be monitored. If the sensors installed in the fire detectors sense the respective hazard parameter or that a threshold value of the respective hazard parameter has been exceeded, they send an alarm signal to an alarm-signal receiving means. According to the invention, this is understood to mean, for example, a gas detection control center, a spark detection control center, a fire detection control center and/or extinguishing control center, a control center for controlling non-extinguishing functions (for example for shutting down installations, for operating shut-off devices for material or energy flows, for opening and closing material discharge flaps) or the like.

According to the invention, a fire detector is understood to be a detector for recognizing hazard parameters, where hazard parameters are understood to be, in particular, electromagnetic radiation, aerosols (in particular smoke aerosols), temperatures, gas concentrations, gas compositions and/or changes in concentration of particular gaseous constituents of fire gases, thermal decomposition products, toxic or combustible gases. In particular applications, exposed components of a fire detector require increased protection against environmental influences.

In particular, sensors for recognizing hazard parameters are not usually designed to be operated in environments with particularly high temperatures. This requires that these sensors be kept away from such areas with very high temperatures, while still ensuring a sufficiently high transmission of the hazard parameter or of the intensity of the hazard parameter, such as temperature or heat, gas concentration or electromagnetic radiation, to the sensor.

Known in the prior art are fire detectors having temperature-resistant hazard parameter conductors that allow the hazard parameter to be transmitted to one or more spaced apart sensors without these sensors being exposed to an environment with particularly high temperatures. Particularly advantageously, hazard parameter conductors are designed to direct or transmit hazard parameters rapidly and/or with low loss.

Thus, for example, temperature-resistant optical waveguides that, depending on the material, are suitable for a multiplicity of wavelength ranges, may be used as hazard parameter conductors for low-loss transmission of electromagnetic radiation. However, such optical waveguides are often sensitive to mechanical stress, in particular bending or vibration, which can cause lasting damage to the glass-fiber bundles inside them. The speed of the electromagnetic radiation in the waveguide is exceptionally high and is almost the speed of light in a vacuum, although dispersion effects reduce the speed slightly.

Furthermore, hollow tubes or hoses, or metal conductors such as shielded copper conductors may be used, for example, as hazard parameter conductors for low-loss transmission of temperature or heat. In this case, the reduction in temperature due to the transmission in the hazard parameter conductor may be determined experimentally or by calculation in advance and taken into consideration in the further evaluation.

Alternatively, for example, plastic or metal pipes may be used as hazard parameter conductors to transmit gases, preferably with an intake device. The transmission speed of the hazard parameter in the hazard parameter conductor can be influenced significantly by such an intake device.

The fire detector YMX5000 FUX of the firm Minimax (registered brand name) in combination with the hazard parameter conductor YMX5000 FUX LWL of the firm Minimax (registered brand name) is a fire detector in which an optical waveguide is attached at its proximal end to an electronic sensor, and at its distal end is screwed into a pre-installed wall holder. This allows the temperature-sensitive sensor to be located at a distance from the environment to be monitored, allows the optical waveguide to be fixed securely to the wall and also enables safe, one-handed mounting. However, it also requires the entire optical waveguide to rotate several times about its longitudinal axis when it is being screwed into the wall holder, i.e. during mounting, resulting in an increased likelihood of damage to the optical waveguide and its glass-fiber bundle, and increasing the mounting effort in consideration of the special safety precautions required as a result. The said fire detector YMX5000 FUX without a hazard parameter conductor is known from WO2017140518.

A further fire detector, having a hazard parameter conductor for high temperature applications, is the spark detector FM 3/8 of the firm Fagus GreCon (registered brand name), which includes an optical waveguide attached at its proximal end to an electronic sensor and connected at its distal end to a pre-installed wall holder. This connection is formed in that the distal end of the optical waveguide is inserted fully into an opening in the wall holder and is fixed there by means of a single radial locking screw. This allows the optical waveguide to be mounted without rotation along the longitudinal axis, but the distal end must be fixed manually while the locking screw is being tightened. This can result in difficulties during mounting, in particular in confined areas, and thus increases the mounting effort. A further disadvantage is that this arrangement can result in sub-optimal positioning of the distal end of the optical waveguide. Another disadvantage is that the single radial locking screw can also result in an insecure connection between the optical waveguide and the wall holder. Firstly, the fixing by the locking screw is effected at a single point only, which can cause the connection to be loosened due to a continuous pull by the weight of the waveguide or part of the waveguide. Secondly, the screw connection can be loosened by thermal expansion and contraction in environments with high temperature variations, in particular constant hot-cold changes.

Against this background, the object of the present invention was to specify an improved fire detector, for applications with high temperatures, that as far as possible overcomes the disadvantages found in the prior art. In particular, the object of the invention was to provide a fire detector, for applications with high temperatures, that enables simplified mounting and optimum positioning and that reduces the likelihood of damage during mounting and operation.

For the purposes of the present invention, high temperatures are temperatures above 80° C., in particular above 105° C., further in particular above 180° C., further in particular above 300° C. High temperatures can prevail, for example, in conveyor pipes and conveyor shafts in waste processing systems, extraction systems in the foodstuffs industry or machine systems.

The invention achieves its underlying object by proposing a modular multi-sensor fire detector that comprises an evaluation unit having a housing, a plurality of sensor heads, and at least one adapter, wherein each of the plurality of sensor heads has a sensor housing, and the sensor housings of the plurality of sensor heads are spaced apart from one another and from the housing of the evaluation unit and are connected to the evaluation unit in a signal-conducting manner, wherein the evaluation unit can be connected in a signal-conducting manner to a spaced apart alarm-signal receiving means, preferably, an alarm-signal receiving unit, and, for example, an alarm-signal receiver, such that the evaluation unit, the sensor heads and the alarm-signal receiving means are not integrated in a common housing or in a plurality of housings attached to one another, wherein at least one of the plurality of sensor heads comprises at least one hazard parameter conductor, and wherein the at least one hazard parameter conductor comprises a mounting tube having a proximal end, a distal end and a securing means, for example, a fastener, at the proximal end, characterized in that the at least one adapter is attached to the mounting tube, wherein the at least one adapter comprises a first fastening point, a second fastening point and a third fastening point; the first fastening point for connection to the securing means on the mounting tube, the second fastening point for connection to a capping device, and the third fastening point for connection to a wall.

The term "spaced apart" is understood to mean that the elements so designated are structurally separate from one another, in particular are not integrated in a common housing or a plurality of housings mounted together, and are spatially offset, or separated, from one another.

The term "proximal" is understood to mean a position or positioning that is facing toward or close to the evaluation unit in the direction of the signal for sensing the hazard parameter, while the term "distal" is understood to mean a position or positioning that is facing away or distant from the evaluation unit in the direction of the signal for sensing the hazard parameter. The direction of the signal for sensing the hazard parameter thus means the direction of the hazard parameter, for example from being received in the hazard parameter conductor, via the sensing by a sensor, to the evaluation by an evaluation unit. The direction of the signal for sensing the hazard parameter may be non-linear, i.e. it may be other than the form of a straight line.

In the following, all properties and features disclosed or described for a single adapter, a single hazard parameter conductor or a single sensor head, in particular for a single adapter, a single hazard parameter conductor or a single sensor head as part of the multi-sensor fire detector, are also to be understood as disclosed or described for at least one or more adapters, or at least one or more hazard parameter conductors, or for a plurality of sensor heads as parts of the multi-sensor fire detector.

Furthermore, the invention achieves its underlying object by proposing an adapter that comprises a body designed for attaching to a pipe, a first fastening point for connection to a hazard parameter conductor, a second fastening point for connection to a capping device, and a third fastening point for connection to a wall.

According to the invention, the at least one hazard parameter conductor together with the adapter can be protected against the local environmental influences, while reduced protective measures are sufficient for the sensor housing of the sensor head, and in particular for the evaluation unit.

The adapter serves as a central fastening means for a mounting tube of the hazard parameter conductor, by means of which the hazard parameter conductor is optimally positioned for sensing a hazard parameter at or in the area to be monitored.

The mounting tube in this case is a tubular constituent part of the hazard parameter conductor, designed for mounting on a wall. Preferably, the mounting tube, as a constituent part of the hazard parameter conductor, is itself also designed to forward the hazard parameter.

The adapter is preferably designed to forward one or more hazard parameters, particularly preferably as a hollow body having one or more openings, further particularly preferably having a cavity that is open at the proximal and the distal end of the adapter.

The hazard parameter conductor is fastened to a wall by means of the adapter, with the capping device fastened to the adapter facing in the direction of the area to be monitored. The hazard parameter is received into the hazard parameter conductor at the mounting tube, directed from the distal to the proximal end in the hazard parameter conductor and transmitted at the distal end to a sensor that is located in a sensor housing of the sensor head.

The hazard parameter conductor preferably includes a flexible part, particularly preferably realized as a flexible metal tube, between its distal and its proximal end, in which case this flexible part may be of any length, preferably a length of 20 cm or more, more preferably a plurality of meters. The proximal end of the hazard parameter conductor in this case is designed to be connected to the sensor housing, and the distal end of the hazard parameter conductor is designed to be connected to the adapter.

The capping device performs, in particular, a protective function and protects the hazard parameter conductor from damage or dirt, while at the same time enabling the hazard parameters to be received into the hazard parameter conductor, or at least not preventing this. The capping device may additionally or alternatively be designed to bundle or concentrate the hazard parameter and thus improve its being received into the hazard parameter conductor. For example, in the case of temperature as the hazard parameter, the capping device may comprise the largest possible surface area of thermally conductive material that is exposed in the area to be monitored, for example in the form of a copper surface. In the case of electromagnetic radiation as the hazard parameter, for example, the capping device may comprise a converging lens.

Further, for example in the case of gas as the hazard parameter, the capping device may comprise a material that is permeable to particular types of gas, preferably made of sintered metal or sintered ceramic, porous plastic or porous metal, or a semi-permeable membrane.

The sensor head is designed to sense the hazard parameters by means of the sensor and to transmit these to the evaluation unit, which is configured to evaluate the hazard parameter, preferably the intensity of the hazard parameter in respect of at least one threshold value, and to transmit an alarm signal to an alarm-signal receiving means if a predetermined criterion, preferably the exceeding or undershooting of the at least one threshold value, is fulfilled.

Alternatively, the sensor head itself may be designed to evaluate, by means of the sensor and a signal processing unit, the hazard parameter, preferably the intensity of the hazard parameter with respect to at least one threshold value, and to transmit the hazard parameter and/or the result of the evaluation, preferably with respect to the at least one threshold value, to the evaluation unit. The evaluation unit may then transmit an alarm signal to an alarm-signal receiving means if the value exceeds or undershoots the at least one threshold value.

The alarm-signal receiving means is preferably designed for bidirectional communication with the evaluation unit. Further preferably, the alarm-signal receiving means is designed to transmit switch-off, control and test signals to the evaluation unit.

The detector according to the invention is further developed in that the sensor head, or at least one of the sensor heads, has a data memory and is configured to store the measured hazard parameters in the data memory.

Preferably, the sensor head is configured to store in the data memory, in a value history, a predetermined number of the most recently sensed hazard parameter values and/or the maxima and/or minima of the sensed hazard parameters, each with a time stamp.

Preferably, in addition to its main sensor for sensing hazard parameters, the sensor head has a temperature sensor for sensing the temperature inside the sensor head and is also preferably configured to store in the data memory, in a value history, a predetermined number of the most recently sensed temperature values from the inside of the sensor head and/or the maxima and/or minima of the sensed temperature inside the sensor head, each with a time stamp.

According to the invention, the sensor heads, in particular sensor heads having different types of sensors, are designed to be able to comprise different types of hazard parameter conductors. In this case, for example, a hazard parameter conductor is realized as an optical waveguide, in particular as a glass-fiber or glass-fiber bundle conductor or as a waveguide, for transmitting electromagnetic radiation, in particular in the ultraviolet, visible or infrared part of the electromagnetic spectrum, including thermal radiation.

In a further embodiment, one hazard parameter conductor is realized, for example, as a temperature conductor, preferably as a metal conductor, in particular having a copper wire, or as a hollow tube for transferring temperature or heat. In the case of a hollow tube, an intake device may particularly preferably be used to direct warm air, gas or air-gas mixture to the sensor more rapidly.

In a further embodiment, one hazard parameter conductor is realized, for example, as a gas conductor, for example, preferably as a hollow tube, particularly preferably having an intake device, in order to direct an air-gas mixture to the sensor more rapidly.

In a further embodiment, a plurality of hazard parameter conductors are realized as any combination of an optical waveguide, a temperature conductor and a gas conductor.

In one embodiment, the modular multi-sensor fire detector may comprise a plurality of sensor heads in any combination, preferably any combination of sensor heads with different types of sensors, preferably for different hazard parameters. For example, the modular multi-sensor fire detector may comprise a first sensor head for sensing infrared electromagnetic radiation, a second sensor head for sensing ultraviolet electromagnetic radiation, and a third sensor head for sensing temperature.

In a further embodiment, the modular multi-sensor fire detector comprises a plurality of sensor heads in any combination, preferably any combination of sensor heads with different types of sensors, preferably for different hazard parameters, the plurality of sensor heads comprising any combination of hazard parameter conductors. For example, the modular multi-sensor fire detector may comprise a first sensor head, for sensing infrared electromagnetic radiation, with a first hazard parameter conductor as an optical waveguide, a second sensor head, for sensing carbon monoxide gas concentration, with a second hazard parameter conductor as a gas conductor, and a third sensor head, for sensing nitrogen gas concentration, with a third hazard parameter conductor as a gas conductor.

According to the invention, the fastening points on the adapter are configured to realize different types of fastenings. Thus, each individual fastening, at the first, or second or third fastening point, may be realized independently and separately from one another as a reversible fastening. This enables simplified maintenance and easier mounting of the individual components.

In particular embodiments, however, it may also be advantageous to make one or more of the fastenings irreversible. Thus, an irreversible fastening of the capping device to the second fastening point, for example by bending or flanging a metal edge following insertion of the capping device into a depression provided for this purpose, can result in an explosion-proof enclosure in terms of explosion protection and thus a higher protection class for explosion-hazard areas.

In one embodiment, the capping device is realized as an optical device to enable or facilitate the reception of electromagnetic radiation as hazard parameters.

This embodiment is advantageous, for example, in conjunction with the design of the hazard parameter conductor as an optical waveguide. The optical device in this case may comprise a window that is transmissive of electromagnetic radiation, preferably made of a material matched to the wavelength range of the electromagnetic radiation, for example sapphire for infrared radiation. Preferably, the optical device may comprise a converging lens.

Alternatively, the capping device may be realized as a thermally conductive capping device to enable or facilitate the transmission of temperature as hazard parameters, in particular advantageously in conjunction with the hazard parameter conductor being realized as a temperature conductor.

Preferably, the first fastening point is located at the proximal end of the adapter, the second fastening point at the distal, i.e. opposite end of the adapter, and the third fastening point between the proximal and the distal end of the adapter, i.e. also between the first and the second fastening point. The positioning of the first and the third fastening point ensures a particularly simple and stable fastening to the adapter, while the positioning of the second fastening point enables the capping device to be fastened as close as possible to the environment to be monitored and thus allows optimum receiving of the hazard parameter.

Alternatively, other positionings are also advantageously possible. Thus, in a further embodiment, the second fastening point may be located between the proximal and the distal end of the adapter, and the third fastening point at the distal end of the adapter. This can be advantageous if the capping device is still located sufficiently close to the environment to be monitored even when attached non-distally to the adapter, for example if the capping device is particularly long.

In a preferred embodiment, the adapter comprises a hollow body having, at the proximal end, a first opening end suitable for receiving the mounting tube. In this embodiment, it is possible to position the mounting tube closer to the capping device, with the result that the hazard parameter conductor is located closer to the environment to be monitored, thereby enabling improved receiving of the hazard parameter.

Particularly preferably, the adapter is realized as a continuous hollow body having a second opening at the distal end to the same cavity. In this case, the mounting tube may be positioned particularly close to the capping device. This prevents the hazard parameter from being significantly weakened by the material of the adapter. In this case, the capping device closes the second opening preferably partially, particularly preferably completely.

In a further embodiment, at least one of the first, second or third fastening points comprises a thread, preferably an external thread. This type of connection makes the fastenings tensile-stable and particularly resistant to thermal expansion and contraction of the metallic components. In a first particularly preferred embodiment, all three fastening points each comprise an external thread. In a second particularly preferred embodiment, the securing means on the adapter is realized as a union nut that can be connected to the first fastening point comprising an external thread, enabling particularly easy one-handed mounting.

The adapter is fastened to a wall by means of the third fastening point in such a way that the mounting tube is suitably positioned for receiving a hazard parameter from the area to be monitored. In one embodiment, the area to be monitored may be behind the wall, and the mounting tube may be positioned by the adapter in such a way that receiving of a hazard parameter can be effected through the wall. Alternatively, in a further embodiment, the area to be monitored may be in front of or next to the wall, and the mounting tube may be positioned by the adapter in such a way that the receiving of a hazard parameter can be effected from another suitable position.

Preferably, the adapter is connected to the wall via a wall holder that comprises a first connector for fastening to the wall, or to a hole in the wall, and a second connector for fastening to the third fastening point of the adapter.

In one embodiment, the third fastening point comprises part of a bayonet fitting, which allows easier mounting by means of a push-and-turn connection, but which tends to be less suitable for particularly high ambient temperatures.

In one embodiment, the first connector may be realized as part of a welded joint, in which the first connector is irreversibly welded to the wall.

Alternatively, the first connector may also be realized, for example, as a screw connection, in which the first connector is held with a thread in an opening in or on a wall by means of an intermediate washer and fixed there by means of a nut.

Furthermore, the second connector is realized as a matching counterpart to the third fastening point. For example, the second connector may be realized as an internal thread if the third fastening point comprises an external thread. Alternatively, the second connector may be realized as a part of a bayonet catch if the third fastening point is realized as the matching second part of the bayonet catch.

The dimensioning of the individual fastening points in relation to one another, in particular with respect to the external dimension at the locations of the fastening points, enables the components to be connected to the fastening points to interlock in an advantageous manner.

In one embodiment, the adapter has a greater outer dimension at the location of the third fastening point than at the location of the second fastening point. This allows the capping device to be enclosed by the third fastening point and the effected fastening of the adapter to the wall. As a result, the capping device is not obstructed or interfered with, in respect of the receiving and transmitting of hazard parameters, by the third fastening point or by the fastening to the wall or to a wall holder.

In another embodiment, the adapter comprises a projection proximal to the third fastening point, the adapter having a greater outer dimension at the location of the projection than at the location of the third fastening point. As a result, when the connection of the third fastening point to the wall is being effected, the projection can delimit the maximum final position of the adapter in respect of the wall, and serve as a stop. Thus, the projection can delimit the positioning of the adapter relative to the wall, in that, when the adapter is optimally or sufficiently optimally positioned, the projection blocks the further approach of the adapter to the wall. In an advantageous embodiment, the third fastening point comprises a thread and is designed for connection to a second connector of a wall holder. The depth of the screw fastening of the connection is then limited by the position of the projection relative to the third fastening point realized as a thread.

An outer dimension in this case is preferably understood to be the outer diameter of an adapter having a circular or oval cross-section. The outer dimension may also be understood for other geometric shapes of the adapter. For example, it may be understood as the maximum diameter of an angular adapter, in particular one having a square or rectangular cross-section.

In a preferred embodiment, the fire detector comprises a first temperature protection class, a second temperature protection class, a third temperature protection class and a fourth temperature class, the first temperature protection class being assigned to the mounting tube, the adapter and the capping device, the second temperature protection class being assigned to the hazard parameter conductor without the mounting tube, the third temperature protection class being assigned to the sensor housing of the sensor head, and the fourth temperature protection class being assigned to the evaluation unit, and the first temperature protection class being greater than the second temperature protection class, the second temperature protection class being greater than the third temperature protection class, and the third temperature protection class being greater than the fourth temperature protection class. The temperature protection class in this case indicates the ability of a component to withstand high temperatures and may be described, for example, as the maximum permitted surface temperature or as the maximum permitted operating temperature.

The invention further relates to an adapter suitable for effecting a connection of a hazard parameter conductor of a fire detector to a wall. The adapter comprises a body for attaching to a tube, a first fastening point for connection to the hazard parameter conductor, a second fastening point for connection to a capping device, and a third fastening point for connection to the wall, the first, second and third fastening points being realized on the body. By means of such an adapter, existing fire detectors can also be retrofitted with hazard parameter conductors, with little effort, for easy mounting and maintenance and to reduce damage during operation. The adapter in this case may preferably be designed in such a way that its first fastening point is specially designed for connection to a particular, already existing fire detector having a hazard parameter conductor, such that no structural alterations need to be made to the existing fire detector. The tube is a constituent part of the hazard parameter conductor or is attachable or attached to this hazard parameter conductor. In a preferred embodiment, the tube is a mounting tube of a hazard parameter conductor of a fire detector.

The body of the adapter is preferably realized as a hollow body having a first, proximal opening and a second, distal opening, the hollow body being designed to receive the tube via the first, proximal opening. This embodiment allows particularly advantageous attaching to the tube, in that the tube is inserted into the adapter.

All features and embodiments disclosed and described for the adapter as part of the fire detector are also to be understood as disclosed and described in connection with the adapter according to the invention, as disclosed in the preceding paragraph on its own. In particular, the adapter according to the invention of this preceding paragraph is also to be understood as an adapter as disclosed and described in the context of the features and embodiments of the fire detector, if it is also assumed that the mounting of the fire detector has not yet been effected.

The invention further relates to a method for connecting a hazard parameter conductor of a fire detector to a wall, which comprises either providing a modular multi-sensor fire detector according to the invention, or providing a fire detector having at least one hazard parameter conductor having a distal securing means and providing an adapter according to the invention, as well as connecting the first fastening point to the distal securing means of the hazard parameter conductor, connecting the second fastening point to the capping device and connecting the third fastening point to the wall. This method according to the invention allows simplified mounting and reduces the likelihood of damage during mounting. Preferably, this method of the second alternative may be performed with any existing fire detector having at least one hazard parameter conductor having with a distal securing means. In particular, this makes it possible to retrofit already installed fire detectors with the advantages of the adapter according to the invention.

In a preferred embodiment of the method, the hazard parameter conductor rotates less than once about its longitudinal axis during the connecting of the first fastening point to the distal securing means. The likelihood of damage to the hazard parameter conductor during installation can thereby be reduced. In the case at least one full rotation about its longitudinal axis during installation, a long hazard parameter conductor can be severely damaged by bending or spontaneous folding. While the likelihood of damage can be reduced by manually holding the hazard parameter conductor even in the case of full rotation about its longitudinal axis, individual faults can directly result in economic damage due to damaged parts and delayed installation and commissioning of the fire detector. In particular, manually holding the hazard parameter conductor to prevent it from rotating can make it more difficult to install the hazard parameter conductor on the wall, as there are fewer hands and also less space available for installation.

In a further embodiment of the method, the steps of connecting are performed in the following sequence: Firstly, connecting the second fastening point to the capping device; secondly, connecting the third fastening point to the wall and, thirdly, connecting the first fastening point to the distal securing means of the hazard parameter conductor. The sequence is particularly advantageous and ensures that the fastening of the hazard parameter conductor is effected as the last of these three steps, and thus the hazard parameter conductor is not damaged due to lack of space or to rotations, in particular due to other screw connections, while the other connections are being effected. Installation of the hazard parameter conductor may in particular be effected after the adapter, with the attached capping device, has been attached to a wall or wall holder by rotating, in particular turning or screwing-in, without the hazard parameter conductor itself rotating or requiring rotation about the longitudinal axis.

BRIEF DESCRIPTION OF THE DRAWINGS

The invention is described in greater detail below, with reference to the accompanying figures, on the basis of preferred exemplary embodiments.

DETAILED DESCRIPTION OF THE INVENTION

Figure 1:
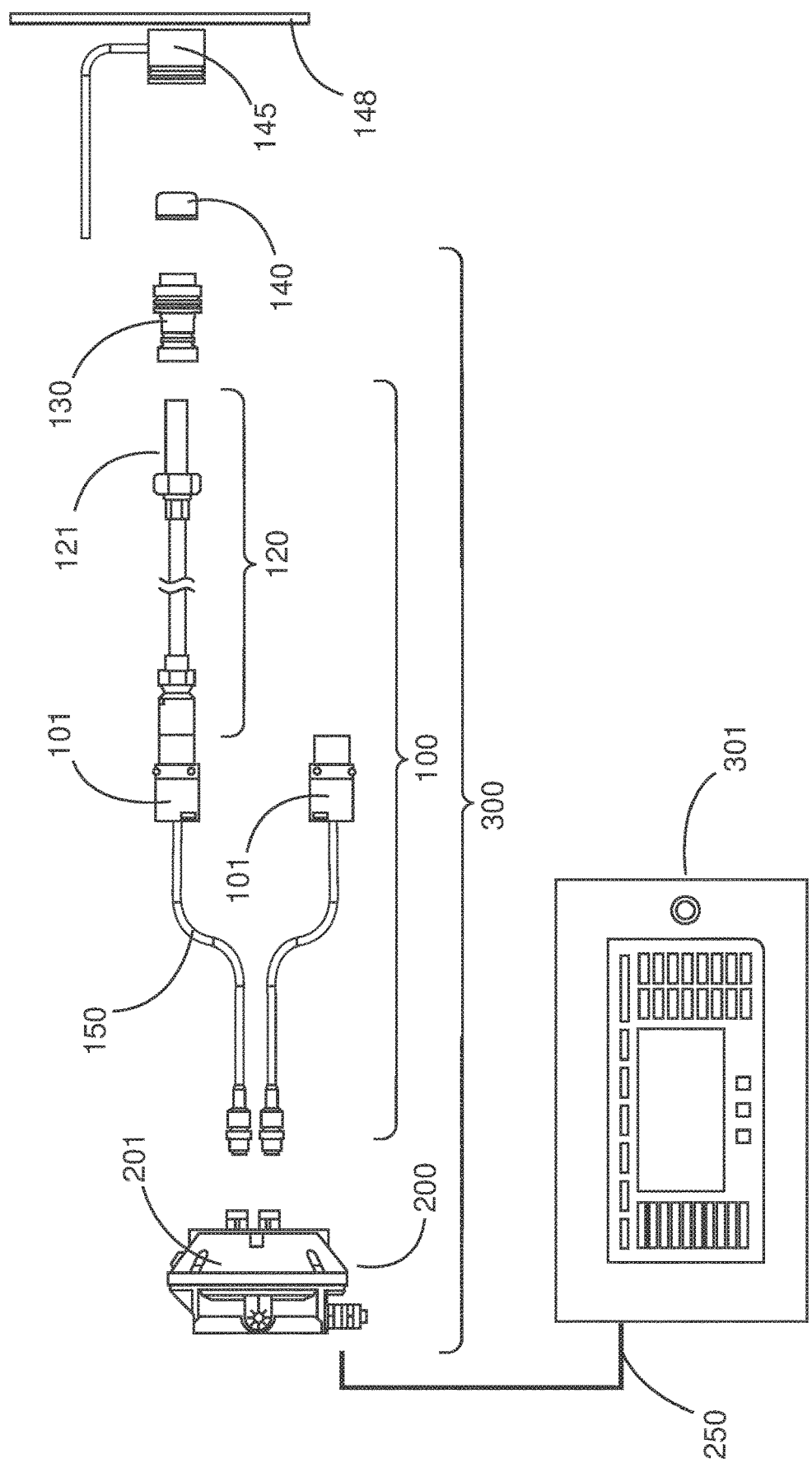
FIG. 1 shows a schematic representation of a detector with a hazard parameter conductor, a wall holder and an alarm-signal receiving unit.

FIG. 1 shows a modular multi-sensor fire detector 300 (hereinafter: detector 300) with a hazard parameter conductor 120 and, connected thereto, a wall holder 145 and an alarm signal receiving unit 301, in an exploded view of the assembled detector. Here, for simplification, individual constituent parts of the detector are represented as non-assembled, but are to be understood as assembled according to this representation. The detector 300 has a plurality of sensor heads 100, each of which is configured for sensing a hazard parameter, for example for sensing electromagnetic radiation, gas, smoke and/or temperatures, although in this exemplary embodiment a single sensor head comprises a hazard parameter conductor 120. Alternatively, in a detector according to the invention, each connected sensor head, or any combination between a sensor head and all sensor heads, may each have such a hazard parameter conductor.

In addition to the sensor heads 100, the detector 300 has a spaced apart evaluation unit 200. The evaluation unit 200 is connected in a signal-conducting manner to the sensor heads 100, which are in turn spaced apart from it, in the present exemplary embodiment by means of a first data line 150. Furthermore, the evaluation unit 200 is connected in a signal-conducting manner to a spaced apart alarm-signal receiving means 301, in the present case by means of a second data line 250. The distances between the sensor heads and the evaluation unit are preferably 20 cm or more, in particular up to several meters. There are no limits to the distance from the evaluation unit to the alarm-signal receiving means within the scope of the possible remote data transmission types.

The sensor heads 100 each have a sensor housing 101 that, as an example for a single sensor head, is connected to the hazard parameter conductor 120 at its proximal end, the hazard parameter conductor 120 terminating at its distal end in a mounting tube 121. The mounting tube 121 is fastened to an adapter 130, a capping device 140 being attached to the distal end thereof, and the mounting tube 121 being designed to receive a hazard parameter at its distal end, through the capping device 140, into the hazard parameter conductor. The hazard parameter is directed to the proximal end of the hazard parameter conductor, where it is transmitted to the sensor in the sensor housing 101.

Proximal to the attached capping device 140, the wall holder 145 is fastened to the adapter 130, the wall holder being in turn fastened to a wall 158. The wall holder 145 in this case may be attached in or to a hole in the wall 158. Alternatively, the wall holder 145 may be attached to a wall 148 without a hole by means of a mounting frame, not shown.

Figure 2:
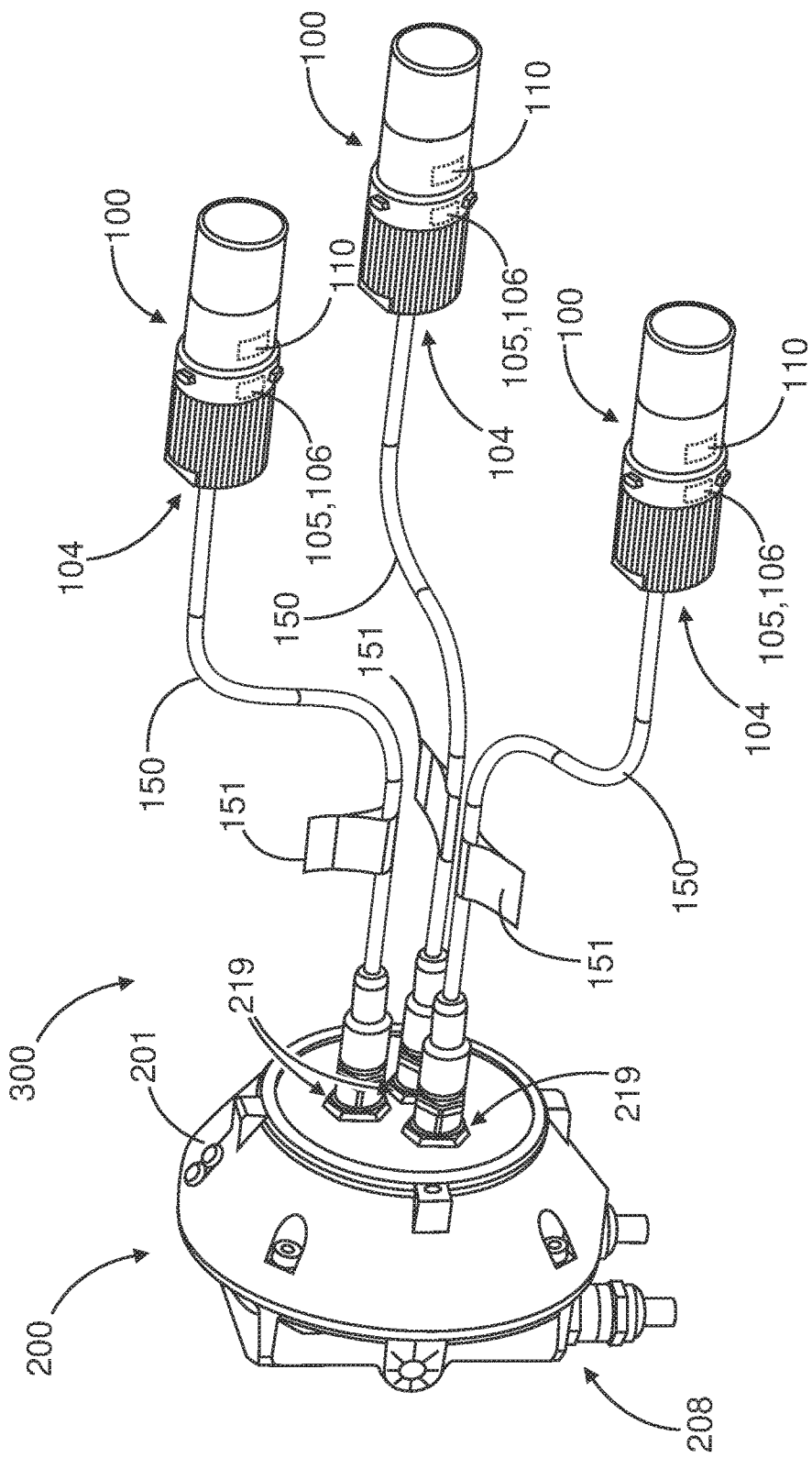
FIG. 2 shows a schematic representation of a detector without a hazard parameter conductor, FIGS. 3A, B show schematic representations of a hazard parameter conductor with an adapter, capping device and wall holder according to various preferred exemplary embodiments, and FIGS. 4A,B show schematic representations of the adapters according to the various preferred exemplary embodiments from FIGS. 3A,B.

FIG. 2 shows in detail the detector 300 with a plurality of sensor heads 100, without a hazard parameter conductor and with an evaluation unit 200. For the sake of simplicity, the sensor heads 100 are all represented as identical, but may be sensor heads of different types. The evaluation unit 200 is connected to the sensor heads 100 in a signal-conducting manner, in the present exemplary embodiment by means of a data line 150. The data line preferably serves as an energy supply for the sensor heads. Alternatively, the signal-conducting connection between the evaluation unit 200 and the sensor heads 100 could also be effected wirelessly, in which case the sensor heads have a dedicated energy supply. The evaluation unit 200 has a plurality of first interfaces 219, by means of which the sensor heads 100 are connected to the evaluation unit 200 in a signal-conducting manner. The sensor heads 100 each have a corresponding interface 104 for this purpose.

While the sensor heads 100 preferably have a flameproof, dust- and liquid-tight sensor housing and a particularly compact design that enables installation in confined monitoring areas, such as power tools, the evaluation unit 200 has a relatively larger housing 201 in a protection class that is comparatively lower than that of the sensor heads 100. The evaluation unit 200 also has a second interface 208, which is designed for, preferably bidirectional, data transmission with an alarm signal receiving means 301 (see FIG. 1). In the exemplary embodiment shown, the second interface 208 is also the current supply, or voltage supply, of the evaluation unit 200. Also advantageous as an alternative or in addition, however, are other second interfaces that, for example, provide wireless communication with the alarm signal receiving unit 301.

In addition to their main sensor for sensing a hazard parameter, or sparks, the sensor heads preferably each comprise a temperature sensor 110, which is configured to sense the temperature inside the sensor housing of the sensor heads 100. The sensor heads are preferably also realized with a data memory 105. The sensor heads 100 also have a signal processing unit 106. In accordance with the preferred embodiments generally described further above, there is also a value history and/or an event history stored in the data memory 105.

The data lines 150 preferably each have an identification tag 151 on which operator information such as, for example, the type of data line or the type of sensor head 100 connected, is stored.

FIGS. 3A and 3B, in an exploded representation, show two different exemplary embodiments of a hazard parameter conductor, with an adapter, a capping device and a wall holder. Here, for simplification, individual constituent parts are represented as non-assembled, but are to be understood as assembled according to this description. FIG. 3A in this case shows a more detailed representation of a distal part of the hazard parameter conductor 120 of FIG. 1, with FIG. 3B showing an alternative embodiment of the same part.

Shown in both FIGS. 3A and 3B is a hazard parameter conductor 120 that terminates at its distal end in a mounting tube 121, with a securing means 125 in the form of a union nut being located at the proximal end of the mounting tube. Proximal to the securing means is a flexible portion of the hazard parameter conductor that can be connected to a sensor housing of the sensor head (not shown).

The respective adapter 130 comprises a body 137 having, realized thereon, a first 131, a second 132 and a third 133 fastening point, a first opening 135 at the proximal end of the body 137 and a second opening, not shown (see FIGS. 4A,B), at the distal end of the body 137. In these two exemplary embodiments, the body of the respective adapter is realized as a hollow body that is open on both sides, the first opening 135 and the second opening being connected to each other through the hollow space.

In these two exemplary embodiments, the first fastening point 131 is located at the proximal end of the body 137, the second fastening point 132 is located at the distal end of the body 137, and the third fastening point 133 is located between the proximal and the distal end of the body 137. The first opening 135 is designed to receive the mounting tube 121, thus enabling the securing means 125 in the form of a union nut to subsequently be connected to the first fastening point 131 in the form of a thread.

The second fastening point 132 is designed so that a capping device 140 can be fastened thereto, in both embodiments the second fastening point 132 comprising an external thread and the capping device 140 comprising a matching internal thread.

In both exemplary embodiments shown, the respective adapter 130 has a larger outer dimension at the location of the third fastening point 133 than at the location of the second fastening point 132.

Both FIGS. 3A and 3B further show a respective wall holder 145 and a wall 148, the wall holder 145 having a first connector 146 for connection to the wall 148 and a second connector 147 for connection to the third fastening point 133.

FIG. 3A shows a third fastening point 133, which comprises an external thread and which can be connected to the second connector 147 of the wall holder 145, the second connector 147 being realized as an internal thread, thereby enabling the connection to be effected as a screw connection. For this purpose, the adapter has a projection 134 proximal to the third fastening point 133, the adapter 130 having a larger outer dimension at the location of the projection 134 than at the location of the third fastening point 133, such that a maximum screwing depth of the screw connection between the third fastening point 133 and the second connector 147 is predefined.

FIG. 3B shows, as an alternative embodiment, a third fastening point 133 that comprises a part of a bayonet catch and that can be connected to the second connector 147 of the wall holder 145, the second connector 147 being realized as a second, mating part of the bayonet catch.

Figure 4A:
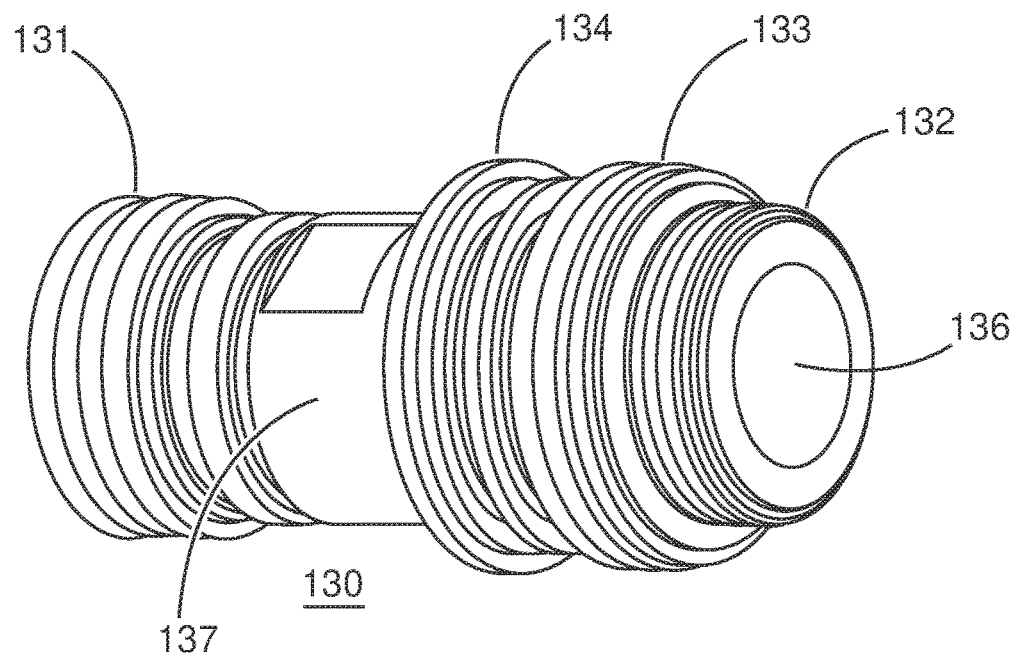
Figure 4B:
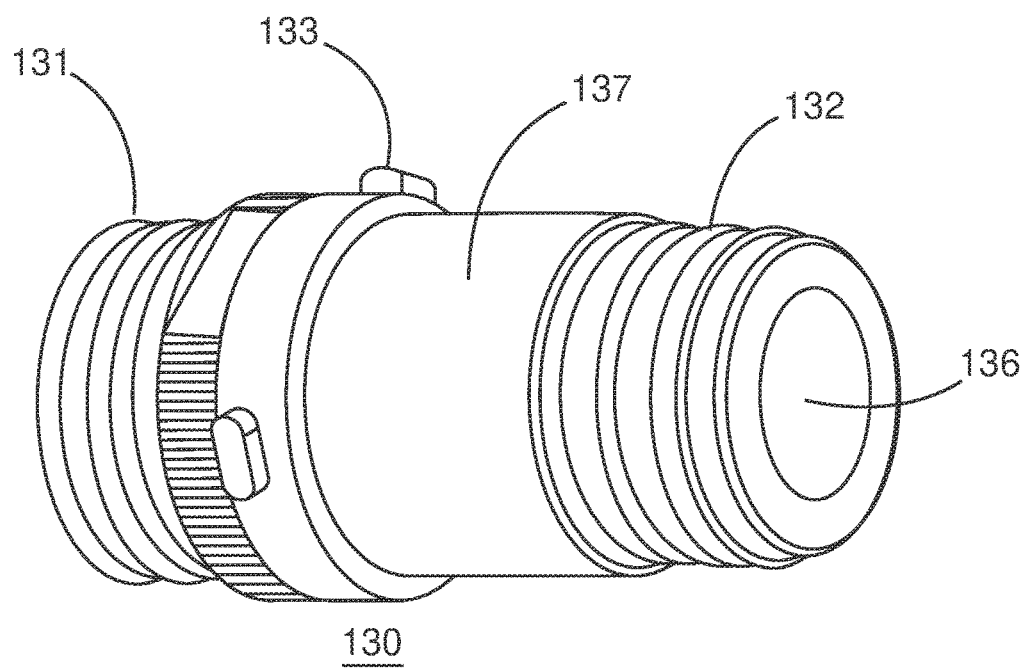

Shown schematically in FIGS. 4A and 4B are the adapters according to the various preferred exemplary embodiments from FIGS. 3A and 3B, each viewed from a different angle. FIG. 4A in this case shows the adapter from FIG. 3A, and FIG. 4B shows the adapter from FIG. 3B.

Shown in both FIGS. 4A and 4B is the second opening 136 of the respective adapter 130, which can be closed by means of a capping device, not shown.

| List of reference numerals | |
|---|---|
| sensor heads | 100 |
| sensor housing | 101 |
| interface, sensor head | 104 |
| data memory | 105 |
| signal processing unit | 106 |
| temperature sensor | 110 |
| hazard parameter conductor | 120 |
| mounting tube | 121 |
| securing means | 125 |
| adapter | 130 |
| first fastening point | 131 |
| second fastening point | 132 |
| third fastening point | 133 |
| projection | 134 |
| first opening | 135 |
| second opening | 136 |
| body | 137 |
| capping device | 140 |
| wall | 148 |
| wall holder | 145 |
| first connector | 146 |
| second connector | 147 |
| first data line | 150 |
| identification tag | 151 |
| evaluation unit | 200 |
| housing | 201 |
| second interface | 208 |
| first interface | 219 |
| second data line | 250 |
| detector | 300 |
| alarm-signal receiving unit | 301 |

The invention claimed is:

1. A modular multi-sensor fire detector, comprising:
an evaluation unit having a housing,
a plurality of sensor heads, and
at least one adapter,
wherein each of the plurality of sensor heads has a sensor housing, and each sensor housings of the plurality of sensor heads is spaced apart from one another and from the housing of the evaluation unit and is connected to the evaluation unit in a signal-conducting manner,
wherein the evaluation unit is connected in a signal-conducting manner to a spaced-apart alarm-signal receiver, such that the evaluation unit, the sensor heads and the alarm-signal receiver are not integrated in a common housing or in a plurality of housings attached to one another,
wherein at least one of the plurality of sensor heads comprises at least one hazard parameter conductor, and
wherein the at least one hazard parameter conductor comprises a mounting tube having a proximal end, a distal end and a fastener at the proximal end,
wherein the at least one adapter is attached to the mounting tube, and
wherein the at least one adapter comprises a first fastening point, a second fastening point and a third fastening point,
the first fastening point configured for connection to the fastener on the mounting tube,
the second fastening point configured for connection to a capping device, and
the third fastening point configured for connection to a wall.

2. The modular multi-sensor fire detector as claimed in claim 1, wherein the at least one hazard parameter conductor comprises an optical waveguide.

3. The modular multi-sensor fire detector as claimed in claim 1, wherein the at least one hazard parameter conductor comprises a temperature conductor.

4. The modular multi-sensor fire detector as claimed in claim 1, wherein
the connections at the first fastening point, at the second fastening point and at the third fastening point are reversible.

5. The modular multi-sensor fire detector as claimed in claim 1, wherein
the connections at the first fastening point and at the third fastening point are reversible, and the connection at the second fastening point is irreversible.

6. The modular multi-sensor fire detector as claimed in claim 1, wherein the capping device comprises an optical device.

7. The modular multi-sensor fire detector as claimed in claim 1, wherein
the first fastening point is located at a proximal end of the at least one adapter,
the second fastening point is located at a distal end of the at least one adapter, and
the third fastening point is located between the proximal and the distal end of the at least one adapter.

8. The modular multi-sensor fire detector as claimed in claim 1, wherein
the at least one adapter comprises a hollow body having, at a proximal end, a first opening end suitable for receiving the mounting tube.

9. The modular multi-sensor fire detector as claimed in claim 1, wherein
at least one of the first, second or third fastening points comprises an external thread.

10. The modular multi-sensor fire detector as claimed in claim 9, wherein
the fastener comprises a union nut.

11. The modular multi-sensor fire detector as claimed in claim 1, wherein
the third fastening point comprises one part of a bayonet catch.

12. The modular multi-sensor fire detector as claimed in claim 1, wherein
the at least one adapter is connected to the wall via a wall holder, the wall holder comprising:
a first connector for fastening to the wall, and
a second connector for fastening to the third fastening point.

13. The modular multi-sensor fire detector as claimed in claim 1, wherein
the at least one adapter has a greater outer dimension at a location of the third fastening point than at a location of the second fastening point.

14. The modular multi-sensor fire detector as claimed in claim 1, wherein
the at least one adapter comprises a projection proximal to the third fastening point, and the at least one adapter has a greater outer dimension at a location of the projection than at a location of the third fastening point.

15. A method for connecting a hazard parameter conductor of a fire detector to a wall, comprising:
providing a modular multi-sensor fire detector as claimed in claim 1,
connecting the first fastening point to the fastener of the at least one hazard parameter conductor, connecting the second fastening point to the capping device, and connecting the third fastening point to the wall.

16. The method for connecting a hazard parameter conductor of a fire detector to a wall as claimed in claim 15, wherein during the connecting of the first fastening point to the fastener, the at least one hazard parameter conductor rotates less than once about a longitudinal axis.

17. The method for connecting a hazard parameter conductor of a fire detector to a wall as claimed in claim 16, wherein the steps of connecting are performed in the following sequence:

connecting the second fastening point to the capping device, connecting the third fastening point to the wall, connecting the first fastening point to the fastener of the at least one hazard parameter conductor.

18. An adapter configured for effecting a connection of a hazard parameter conductor of a fire detector to a wall, comprising:

a body designed for attaching to a tube, a first fastening point configured for connection to the hazard parameter conductor, a second fastening point configured for connection to a capping device, and a third fastening point configured for connection to the wall.

19. The adapter for effecting a connection of a hazard parameter conductor of a fire detector to a wall as claimed in claim 18, wherein the body comprises a hollow body having a first, proximal opening and a second, distal opening, and the hollow body is designed to receive the tube via the first, proximal opening.

\* \* \* \* \*